US006935129B2

(12) United States Patent
Sasaki et al.

(10) Patent No.: US 6,935,129 B2
(45) Date of Patent: Aug. 30, 2005

(54) HEAT EXCHANGER AND COMBINED CYCLE SYSTEM USING THE SAME

(75) Inventors: Minoru Sasaki, Anjo (JP); Atsushi Inaba, Kariya (JP); Takashi Yamanaka, Kariya (JP); Eiichi Torigoe, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/829,996

(22) Filed: Apr. 22, 2004

(65) Prior Publication Data
US 2004/0237576 A1 Dec. 2, 2004

(30) Foreign Application Priority Data

Apr. 25, 2003 (JP) ........................................ 2003-122280

(51) Int. Cl.[7] .............................................. F25B 27/00
(52) U.S. Cl. .................... 62/238.4; 62/323.2; 60/618
(58) Field of Search ............................ 62/DIG. 2, 207, 62/238.4, 323.2, 323, 498, 501; 417/348, 379; 60/618

(56) References Cited

U.S. PATENT DOCUMENTS

| 4,823,560 | A | * | 4/1989 | Rowley et al. ................ 62/467 |
| 4,876,856 | A | * | 10/1989 | Iishiki et al. .................. 60/671 |
| 5,129,236 | A | * | 7/1992 | Solomon .................... 62/324.1 |
| 5,275,014 | A | * | 1/1994 | Solomon .................... 62/324.1 |
| 5,313,874 | A | * | 5/1994 | Lackstrom ................... 91/459 |
| 5,336,059 | A | * | 8/1994 | Rowley ....................... 417/348 |
| 5,509,274 | A | * | 4/1996 | Lackstrom ................... 237/2 B |
| 6,237,356 | B1 | * | 5/2001 | Hori et al. .................. 62/324.1 |
| 6,349,551 | B1 | * | 2/2002 | Jirnov et al. .................... 62/87 |
| 6,606,848 | B1 | * | 8/2003 | Rollins, III .............. 60/39.182 |
| 6,615,585 | B2 | * | 9/2003 | Tsuji ............................ 60/728 |
| 6,637,183 | B2 | * | 10/2003 | Viteri et al. ............. 60/39.182 |
| 6,644,011 | B2 | * | 11/2003 | Cheng ..................... 60/39.182 |

FOREIGN PATENT DOCUMENTS

| JP | 55-63336 A | * | 5/1980 |
| JP | 55-99561 |   | 7/1980 |
| JP | 2-50055 A | * | 2/1990 |
| JP | 2540738 |   | 7/1996 |

* cited by examiner

Primary Examiner—William E. Tapolcai
Assistant Examiner—Mohammad M. Ali
(74) Attorney, Agent, or Firm—Harness, Dickey & Pierce, PLC

(57) ABSTRACT

A radiator for a vapor-compression refrigerant cycle and a condenser for a Rankine cycle are integrated to construct a heat exchanger. The heat exchanger includes a core portion for performing a heat exchange, and is disposed to have a first function portion used as the radiator and a second function portion used as the condenser. A function ratio changing ratio includes a displacement member such as a plunger disposed in a header tank of the heat exchanger, and changes a ratio between the first function portion and the second function portion. For example, the displacement member partitions an inner space of the header tank into two space parts when both the vapor-compression refrigerant cycle and the Rankine cycle are operated, and does not partition the inner space when only one of the vapor-compression refrigerant cycle and the Rankine cycle is operated.

17 Claims, 13 Drawing Sheets

HEAT EXCHANGER AND COMBINED CYCLE SYSTEM USING THE SAME

CROSS REFERENCE TO RELATED APPLICATION

This application is based on Japanese Patent Application No. 2003-122280 filed on Apr. 25, 2003, the disclosure of which is incorporated herein by reference.

FIELD OF THE INVENTION

The present invention relates to a heat exchanger for a combined cycle system including a vapor-compression refrigerant cycle and a Rankine cycle. The combined cycle system is suitably used for a vehicle air conditioner.

BACKGROUND OF THE INVENTION

In a vehicle air conditioner described in JP Patent No. 2540738, a super-heat vapor generated by exhaust heat of an internal combustion engine (referred to as engine) is supplied to a compressor, and the compressor is operated as an expansion device, so that power is recovered from the exhaust heat. When a vapor-compression refrigerant cycle is operated in summer, the compressor is not operated as the expansion device, and power cannot be recovered from the exhaust heat of the vehicle.

By contrast, in a combined cycle system described in JP-A-55-99561, a Rankine cycle for recovering power from exhaust heat is provided separately from a vapor-compression refrigerant cycle, and the power recovered in the Rankine cycle is supplied to a compressor of the vapor-compression refrigerant cycle. Therefore, the Rankine cycle and the vapor-compression refrigerant cycle can be operated at the same time. However, in this case, a radiator (condenser) for the vapor-compression refrigerant cycle and a condenser for the Rankine cycle need to be provided, and a large mounting space for mounting both of the radiator and the condenser is required. Therefore, it is difficult for the combined cycle system to be mounted in a small mounting space.

Generally, a condensation pressure in the Rankine cycle is higher than a pressure of the high-pressure side refrigerant in the vapor-compression refrigerant cycle. Thus, when the radiator of the vapor-compression refrigerant cycle and the condenser of the Rankine cycle are commonly used while the same kind of fluid as the refrigerant of the vapor-compression refrigerant cycle is used as a circulation fluid of the Rankine cycle, the pressure of the high-pressure side refrigerant of the vapor-compression refrigerant cycle increases to approach to the condensation pressure of the Rankine cycle. Therefore, a discharge pressure of the compressor is increased, and power consumption in the compressor is increased. As a result, the coefficient of performance of the vapor-compression refrigerant cycle is deteriorated, and sufficient cooling capacity may be not obtained in the vapor-compression refrigerant cycle when the vapor-compression refrigerant cycle is used as a vehicle air conditioner.

SUMMARY OF THE INVENTION

In view of the above-described problems, it is an object of the present invention to improve mounting performance of a heat exchanger for a combined cycle system including a vapor-compression refrigerant cycle and a Rankine cycle.

It is another object of the present invention to provide a combined cycle system using the heat exchanger, in which consumption power of a compressor of a vapor-compression refrigerant cycle can be effectively reduced while the performance of the vapor-compression refrigerant cycle can be improved.

According to the present invention, a heat exchanger for a combined cycle system having a vapor-compression refrigerant cycle and a Rankine cycle includes a core portion in which at least one of a refrigerant in the vapor-compression refrigerant cycle and a fluid in the Rankine cycle flows. The heat exchanger is provided to have at least one of a first function portion used as a radiator of the vapor-compression refrigerant cycle and a second function portion used as a condenser of the Rankine cycle. In the heat exchanger, a function ratio changing unit is provided to change a ratio between the first function portion and the second function portion in the core portion.

For example, when both the vapor-compression refrigerant cycle and the Rankine cycle are operated, the function ratio changing unit is operated to have both the first function portion and the second function portion in the core portion. When only the vapor-compression refrigerant cycle is operated, the function ratio changing unit is operated to have only the first function portion in the core portion. In addition, when only the Rankine cycle is operated, the function ratio changing unit is operated to have only the second function portion in the core portion. In this case, generally, the fluid used in the Rankine cycle is the same material as the refrigerant.

Preferably, in the heat exchanger, the core portion includes a plurality of tubes through which at least one of the refrigerant and the fluid flows, and first and second header tanks are disposed at two end sides of each tube in a tube longitudinal direction, respectively, to extend in a tank longitudinal direction perpendicular to the tube longitudinal direction and to communicate with the tubes. Further, the function ratio changing unit is disposed in each of the first and second header tanks to change the ratio between the first function portion and the second function portion in the core portion.

For example, the function ratio changing unit includes a displacement member that is displaced in a direction perpendicular to the tank longitudinal direction to switch between a first case where an inner space of each header tank is separated into plural space parts and a second case where the inner space of each header tank is a single communication space without a partition due to the displacement member. Further, the function ratio changing unit changes the ratio between the first function portion and the second function portion in the core portion by switching between the first case and the second case.

Alternatively, the function ratio changing unit includes a valve body having a through hole, disposed in each of the first and second header tanks, and the valve body is disposed in each of the first and second header tanks to switch between the first case and the second case. Further, the function ratio changing unit changes the ratio between the first function portion and the second function portion in the core portion by switching between the first case and the second case.

Alternatively, the function ratio changing unit includes a butterfly valve body disposed in each of the first and second header tanks, and the valve body is disposed in each of the first and second header tanks to switch between the first case and the second case. Further, the function ratio changing unit changes the ratio between the first function portion and the second function portion in the core portion by switching between the first case and the second case. Alternatively, the function ratio changing unit includes a displacement member that is displaced in the tank longitudinal direction to switch between the first case and the second case. At this time, the function ratio changing unit can continuously change the ratio between the first function portion and the second function portion in the core portion.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS (First Embodiment)

Figure 1:
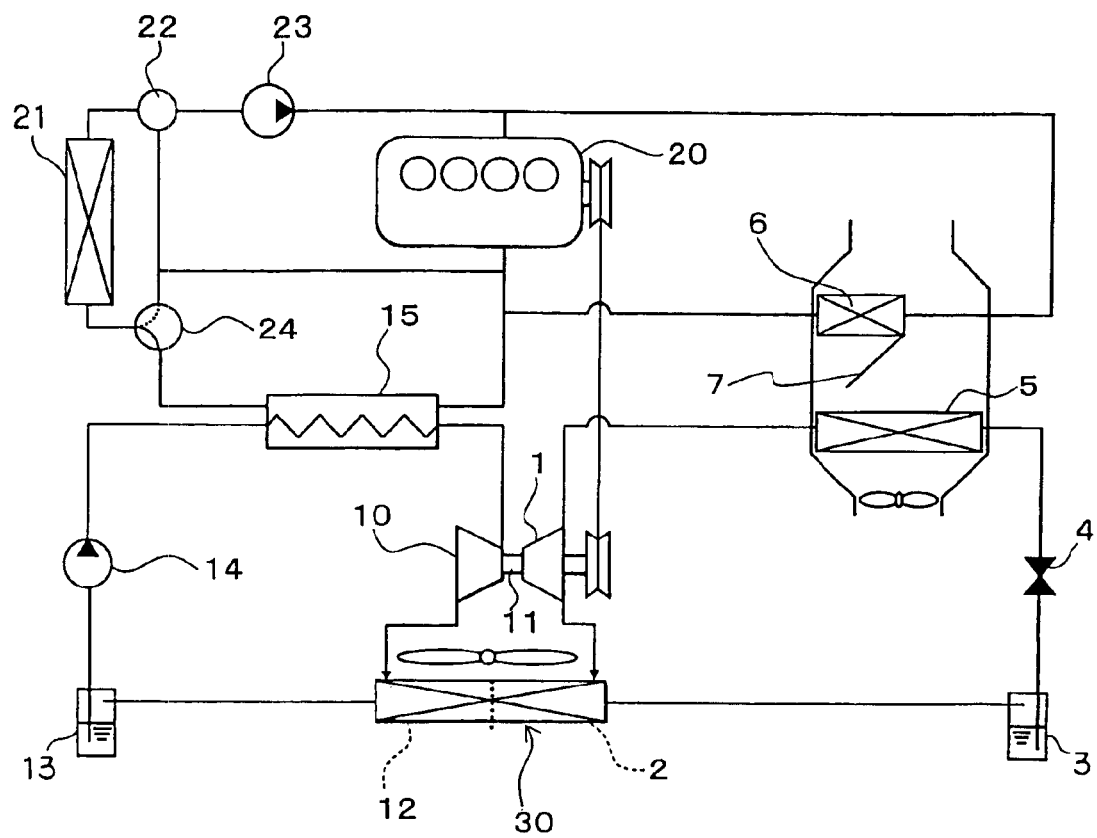
FIG. 1 is a schematic diagram of a combined cycle system including a vapor-compression refrigerant cycle and a Rankine cycle according to a first embodiment of the present invention.

The first embodiment of the present invention will be now described with reference to FIGS. 1–4B. In the first embodiment, a heat exchanger of the present invention is typically used for a combined cycle system for a vehicle. FIG. 1 shows a vehicle air conditioner using the combined cycle system.

A compressor 1 is provided for sucking and compressing refrigerant. A radiator 2 (condenser, cooler) is a high-pressure side heat exchanger for cooling high-pressure refrigerant discharged from the compressor 1 by radiating heat to atmosphere. In this embodiment, because freon (R134a) is used as the refrigerant, the enthalpy of the refrigerant decreases in the radiator 2, while gas refrigerant discharged from the compressor 1 is condensed and liquefied in the radiator 2.

Refrigerant discharged from the radiator 2 flows into a receiver 3 (gas-liquid separator), and is separated into liquid refrigerant and gas refrigerant in the receiver 3. Surplus refrigerant in the vapor-compression refrigerant cycle is stored in the receiver 3. High-pressure liquid refrigerant supplied from the receiver 3 is decompressed in an expansion valve 4. In this embodiment, the expansion valve 4 is a thermal expansion valve in which a throttle opening degree of the expansion valve 4 is controlled so that a super-heating degree of the refrigerant to be sucked into the compressor 1 becomes a predetermined value.

An evaporator 5 is a low-pressure side heat exchanger in which low-pressure refrigerant decompressed in the expansion valve 4 is evaporated by performing heat exchange between the low-pressure refrigerant and air to be blown into a compartment of a vehicle. Therefore, air passing through the evaporator 5 is cooled and dehumidified.

In this embodiment, the compressor 1, the radiator 2, the receiver 3, the expansion valve 4 and the evaporator 5 are coupled to construct the vapor-compression refrigerant cycle in which heat is transferred from a low-temperature side to a high-temperature side.

A heater 6 heats air to be blown into the compartment of the vehicle by using hot water heated by exhaust heat in the vehicle as a heat source. For example, the exhaust heat is generated in the engine 20. In this embodiment, the heater 6 is disposed in an air duct at a downstream air side of the evaporator 5. Further, the heater 6 is arranged in the air duct to form a bypass passage through which air from the evaporator 5 bypasses the heater 6. An air mixing door 7 is disposed in the air duct to adjust a ratio between an air amount flowing through the heater 6 and an air amount passing through the bypass passage. Therefore, the air mixing door 7 can adjusts temperature of air to be blown into the compartment of the vehicle.

Next, a Rankine cycle will be now described. An expansion device 10 is an energy recovering device for recovering mechanical energy by expanding a super-heat vapor fluid. In this embodiment, the mechanical energy recovered in the expansion device 10 is transmitted to the compressor 1 through a power transmitting device for intermittently transmitting power, such as an electromagnetic clutch 11.

A condenser 12 is a radiator for condensing the vapor fluid from the expansion device 10 by performing heat exchange between the vapor fluid from the expansion device 10 and outside air. A receiver 13 is a gas-liquid separator that separates the fluid flowing from the condenser 12 into a gas fluid and a liquid fluid, and stores the liquid fluid therein as an excess fluid.

A pump 14 is an electric pump for drawing the liquid fluid from the receiver 13 and for sending the drawn liquid fluid to a heating unit 15. In this embodiment, the heating unit 15 is a super-heat generating unit in which the fluid discharged from the pump 14 is heated to generate a super-heat vapor. Generally, the heating unit 15 heats the fluid to generate the super-heat vapor, by using hot water that is heated by the exhaust heat generated in the vehicle such as in the engine 20.

In this embodiment, the expansion device 10, the condenser 12, the receiver 13, the pump 14 and the heating unit 15 construct the Rankine cycle for recovering power from the exhaust heat. In this example of FIG. 1, the condenser 12 and the radiator 2 are integrated and refrigerant of the vapor-compression refrigerant cycle can flow into the condenser 12. Therefore, the operation fluid in the Rankine cycle is generally the same fluid as the refrigerant in the vapor-compression refrigerant cycle.

Next, an engine water cycle will be now described. A radiator 21 is a heat exchanger for cooling engine-cooling water by performing a heat exchange between the engine-cooling water flowing from the engine 20 and outside air. A thermostat 22 is disposed to adjust the temperature of the engine-cooling water, that is, the temperature of the engine 20. Specifically, the thermostat 22 adjusts an amount of the engine-cooling water flowing into the radiator 21 and an amount of the engine-cooling water bypassing the radiator 21 so as to adjust the temperature of the engine 20.

A water pump 23 for circulating the engine-cooling water in the engine water cycle is driven by the power from the engine 20. However, an electrical pump can be used as the water pump 23.

A valve 24 is a three-way valve for switching between a case where high-temperature engine-cooling water flows into the heating unit 15 and a case where the high-temperature engine-cooling water does not flow into the heating unit 15. The valve 24 is operated to be electrically linked with an operation of the pump 14.

Figure 2A:
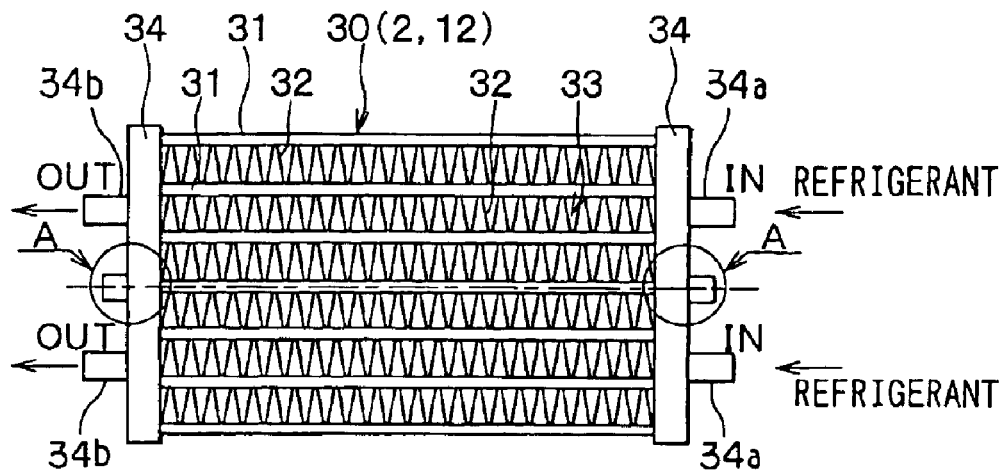
FIG. 2A is a front view showing a heat exchanger used for the combined cycle system when both the vapor-compression refrigerant cycle and the Rankine cycle are simultaneously operated according to the first embodiment.

In this embodiment, the radiator 2 and the condenser 12 are integrated to form an integrated heat exchanger 30, as shown in FIGS. 1 and 2A. As shown in FIG. 2A, the heat exchanger 30 includes a core portion 33 and two header tanks 34 disposed at two ends of the core portion 33. The core portion 33 includes a plurality of tubes 31 through which the refrigerant (fluid) flows, and a corrugated fins 32 joined to outer surfaces of the tubes 31 to increase a heat transmitting area with air. The header tanks 34 extend in a direction perpendicular to a longitudinal direction of the tubes 31 to communicate with the tubes 31 at two longitudinal ends of each tube 31.

Two inlet portions 34a are provided in one header tank 34 at two sides in the longitudinal direction of the header tank 34. For example, one inlet portion 34a is positioned at an approximate middle portion between one longitudinal end of the header tank 34 and a center of the header tank 34 in the longitudinal direction, and the other inlet portion 34a is positioned at an approximate middle portion between the other longitudinal end of the header tank 34 and a center of the header tank 34 in the longitudinal direction. Similarly, two outlet portions 34b are provided in the other header tank 34 at positions corresponding to the positions of the inlet portions 34a in the longitudinal direction of the header tank 34. In this embodiment, the heat exchanger 30 is a multi-flow type.

Figure 2B:
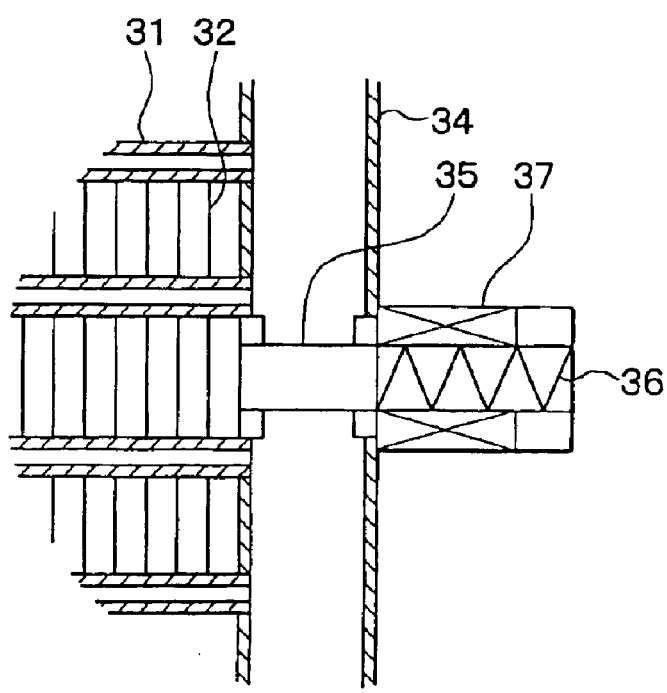
FIG. 2B is an enlarged partial sectional view of a portion A indicated in FIG. 2A.
Figure 3A:
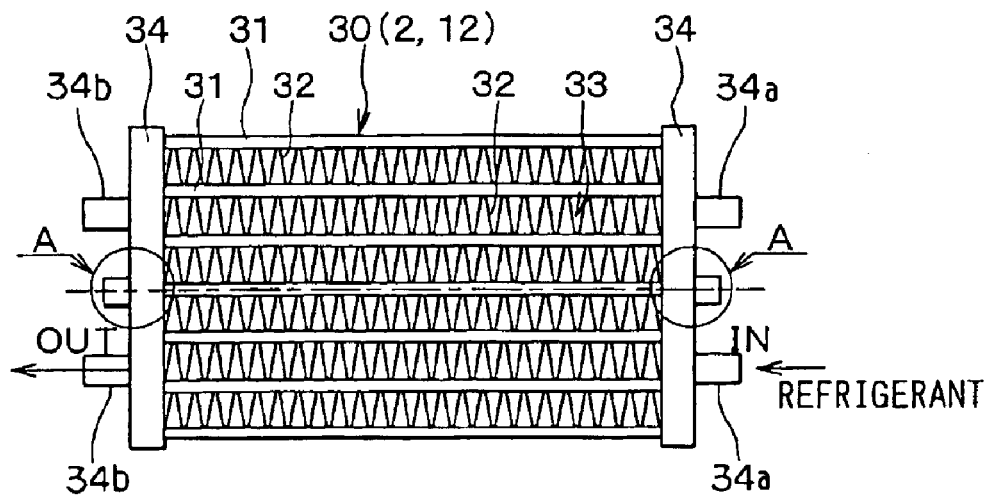
FIG. 3A is a front view showing the heat exchanger used for the combined cycle system when only the vapor-compression refrigerant cycle is operated according to the first embodiment.
Figure 3B:
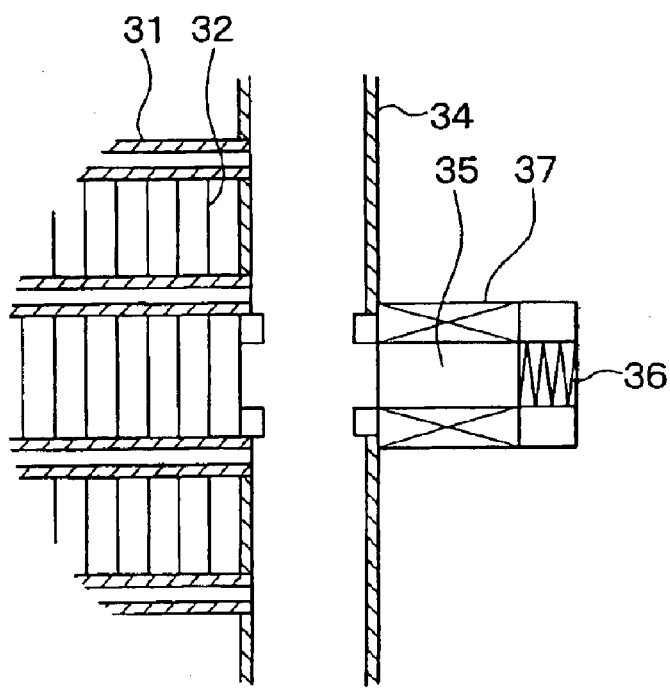
FIG. 3B is an enlarged partial sectional view of a portion A indicated in FIG. 3A.
Figure 4A:
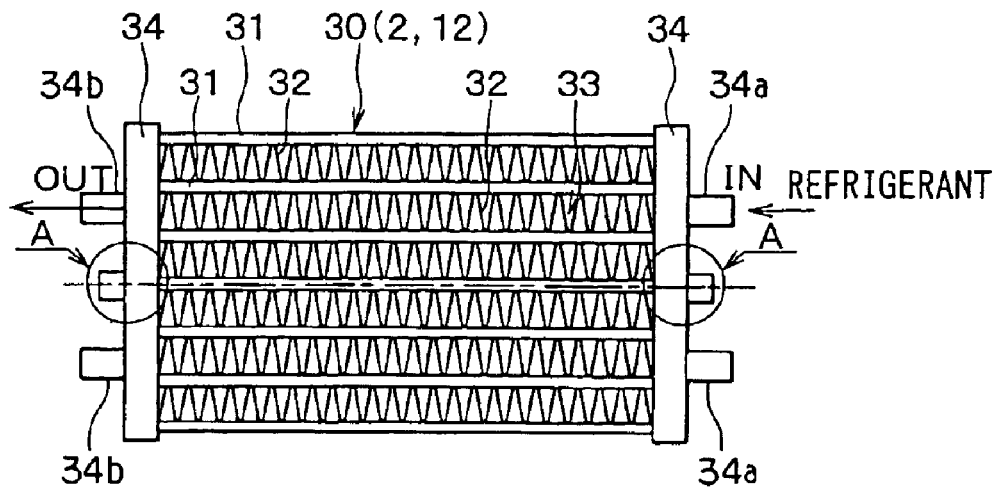
FIG. 4A is a front view showing the heat exchanger used for the combined cycle system when only the Rankine cycle is operated according to the first embodiment.
Figure 4B:
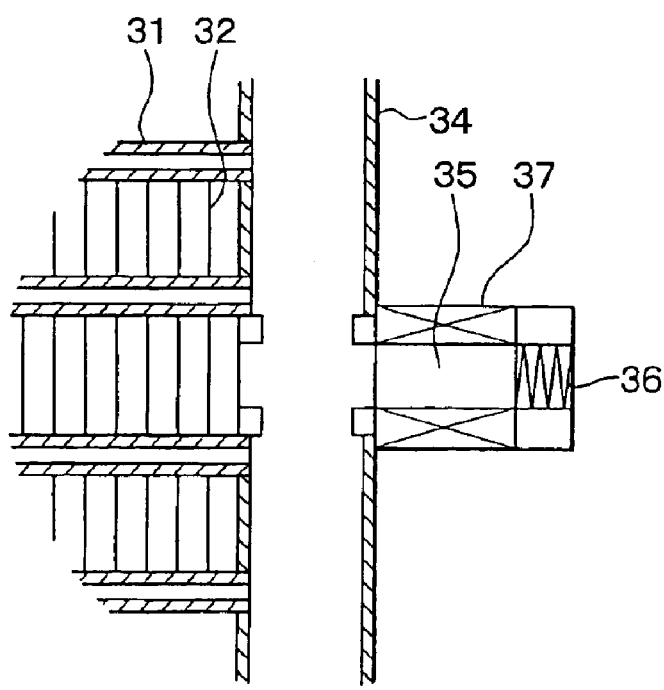
FIG. 4B is an enlarged partial sectional view of a portion A indicated in FIG. 4A.

As shown in FIG. 2B, a plunger 35 is provided in the header tank 34 at an approximate center portion of the header tank 34 in the longitudinal direction of the header tank 34 to be displaced in a direction perpendicular to the longitudinal direction of the header tank 34. The plunger 35 is moved to switch between a first case where an inner space of the header tank 34 is partitioned into upper and a lower two space parts, and a second case where the two space parts of the header tank 34 are not partitioned from each other. In the second case, the inner space of the header tank 34 is a single communication space. In this embodiment, the plunger 35 is displaced by an elastic member such as a coil spring 36 and an excitation coil 37.

When the excitation coil 37 is dis-energized, the plunger 35 is displaced toward the core portion 33 by elastic force of the coil spring 36 to partition the two space parts of the header tank 34 from each other. In contrast, when the excitation coil 37 is energized, the plunger 35 is displaced to a side opposite to the core portion 33 by electromagnetic force of the excitation coil 37 to communicate the two space parts of the header tank 34 with each other. In this embodiment, the left header tank 34 can have the same structure of the right header tank 34.

Next, operation of the combined cycle system including the heat exchanger 30 will be now described. Here, the fluid circulating in Rankine cycle is the same material as the refrigerant circulating in the vapor-compression refrigerant cycle.

When both the vapor-compression refrigerant cycle and the Rankine cycle are operated at the same time, the excitation coil 37 is dis-energized so that the inner space of the header tank 34 is partitioned into the upper and lower two space parts as shown in FIG. 2B. In this case, the compressor 1 and the pump 14 are operated, and high-temperature engine-cooling water is circulated to the heating unit 15.

Accordingly, when both the vapor-compression refrigerant cycle and the Rankine cycle are operated, refrigerant discharged from the compressor 1 flows into an approximate lower half part of the core portion 33 through the lower space part of the header tank 34, and refrigerant discharged from the expansion device 10 flows through an approximate upper half part of the core portion 33. In this example, the refrigerant (fluid) discharged from the compressor 1 flows into the lower half part of the core portion 33 through the lower space part of the header tank 34, and the refrigerant (fluid) discharged from the expansion device 10 flows through the upper half part of the core portion 33. However, this arrangement of the lower half part and the upper half part in the core portion 33 can be changed. For example, refrigerant discharged from the compressor 1 can flow into the upper half part of the core portion 33 through the upper space part of the header tank 34, and refrigerant discharged from the expansion device 10 can flow into the lower half part of the core portion 33.

According to the first embodiment, when both the vapor-compression refrigerant cycle and the Rankine cycle are operated, the inner space in each header tank 34 is partitioned into the upper space part and the lower space part so that an approximate half part of the core portion 33 is used as the radiator 2 and the other approximate half part of the core portion 33 is used as the condenser 12. Thus, in the vapor-compression refrigerant cycle, refrigerant circulates in this order of the compressor 1→the heat exchanger 30 (radiator 2)→the receiver 3→the expansion valve 4→the evaporator 5→the compressor 1. Therefore, refrigerant is evaporated in the evaporator 5 by absorbing heat from air to be blown into the vehicle compartment, while the heat from the gas refrigerant evaporated in the evaporator 5 is radiated in the radiator 2 constructed in the heat exchanger 30. In contrast, in the Rankine cycle, super-heat refrigerant vapor generated in the heating unit 15 is decompressed and is expanded in the expansion device 10 in iso-entropy, and mechanical energy corresponding the expanding energy is output. In this embodiment, the output shaft of the expansion device 10 is coupled to a rotation shaft of the compressor 1 through the electromagnetic clutch 11. Therefore, the power recovered in the expansion device 10 can be supplied to the compressor 1.

The compressor 1 can be also operated by power from the engine 20 through the power transmitting device for intermittently supplying the power from the engine. Thus, when a necessary cooling capacity can be obtained while the compressor 1 is operated only by using the power recovered from the expansion device 10, a power supply from the engine 20 to the compressor 1 is stopped.

When only the vapor-compression refrigerant cycle is operated, the excitation coil 37 is energized so that the upper and lower space parts in each header tank 34 communicate with each other. Further, the compressor 1 is operated while the electromagnetic clutch 11 is disconnected. Therefore, high-pressure refrigerant discharged from the compressor 1 flows into all area of the core portion 33 of the heat exchanger 30, and all the area of the core portion 33 of the heat exchanger is used as the radiator 2 in the vapor-compression refrigerant cycle. Thus, in the vapor-compression refrigerant cycle, refrigerant circulates in this order of the compressor 1→the heat exchanger 30 (radiator 2)→the receiver 3→the expansion valve 4→the evaporator 5→the compressor 1. Therefore, refrigerant is evaporated in the evaporator 5 by absorbing heat from air to be blown into the vehicle compartment, while the heat from the gas refrigerant evaporated in the evaporator 5 is radiated in the radiator 2 constructed in the heat exchanger 30.

When only the Rankine cycle is operated, electrical power is supplied to the excitation coil 37 so that the upper and lower two space parts in each of the header tanks 34 communicate with each other. Further, the pump 14 is operated while the electromagnetic clutch 11 is disconnected. Thus, all the area of the core portion 33 of the heat exchanger 30 is used as the condenser 12, and refrigerant flowing out of the expansion device 10 flows into approximately all the area of the core portion 33 of the heat exchanger 30.

Thus, in the Rankine cycle, super-heat refrigerant vapor (fluid vapor) generated in the heating unit 15 is decompressed and is expanded in the expansion device 10 in iso-entropy, and mechanical energy corresponding the expanding energy is output. Because the vapor-compression refrigerant cycle is stopped, the power recovered in the expansion device 10 can be supplied to a generator. In this case, the generator is operated and the recovered power can be stored as electrical power in a battery.

According to the first embodiment of the present invention, a function ratio changing unit, for changing a ratio between a first function portion and a second function portion in the core portion 33 of the heat exchanger 30, is constructed with the plunger 35, the coil spring 36 and the excitation coil 37. Here, the first function portion is a portion used as the radiator 2 into which the high-pressure refrigerant from the compressor 1 flows, and the second function portion is a portion used as the condenser 12 into which vapor refrigerant after the expansion flows. Because the ratio between the first function portion and the second function portion can be changed in the core portion 33 of the heat exchanger 30 by using the function ratio changing unit, it is possible to obtain both the functions of the radiator 2 and the condenser 12 in the single heat exchanger 30.

Further, the radiator 2 and the condenser 12 are integrated as the single heat exchanger 30, and the ratio between the first function portion used as the radiator 2 and the second function portion used as the condenser 12 can be changed by displacing the position of the plunger 35. Therefore, a space for mounting the radiator 2 and the condenser 12 in the vehicle can be effectively reduced in the combined cycle system.

In addition, the first function portion used as the radiator 2 and the second function portion used as the condenser 12 are partitioned from each other in the single heat exchanger 30. Therefore, it can prevent the pressure of the high-pressure side refrigerant of the vapor-compression refrigerant cycle from being increased to a condensation pressure in the Rankine cycle, thereby preventing the pressure in the first function portion and the pressure in the second function portion from being uniform As a result, even when both the first and second function portions are integrated as the single heat exchanger 30, it can prevent the consumption power in the compressor 1 from being increased due to an increase of the discharge pressure of the compressor 1. Therefore, the coefficient of performance (COP) in the vapor-compression refrigerant cycle can be prevented from being deteriorated, and a sufficient cooling capacity can be obtained in the vapor-compression refrigerant cycle.

(Second Embodiment)

Figure 5A:
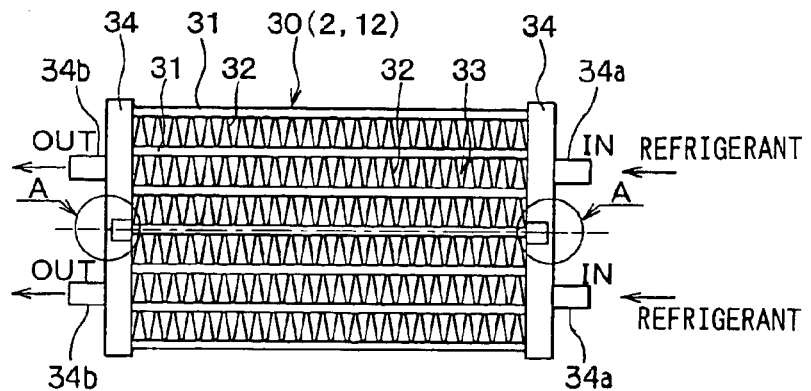
FIG. 5A is a front view showing a heat exchanger used for a combined cycle system when both the vapor-compression refrigerant cycle and the Rankine cycle are simultaneously operated according to a second embodiment of the present invention.
Figure 5B:
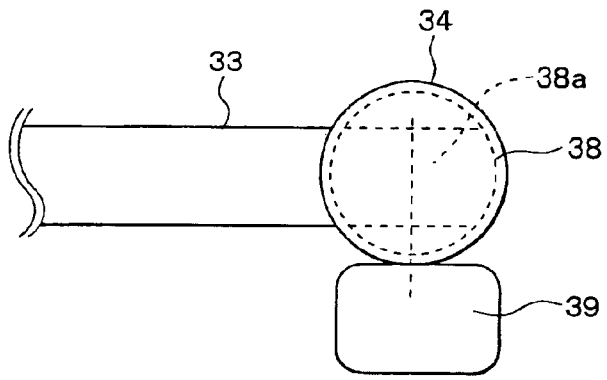
FIG. 5B is a partial top view showing the heat exchanger in FIG. 5A.
Figure 6:
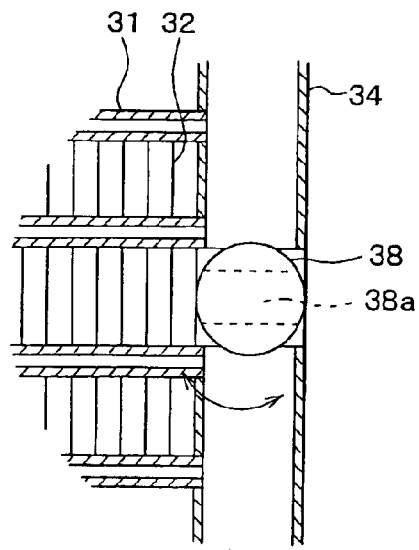
FIG. 6 is an enlarged partial sectional view of a portion A in FIG. 5A.

The second embodiment of the present invention will be now described with reference to FIGS. 5A to 10. In the above-described first embodiment, the plunger 35 is displaced while sliding so as to switch between a case where the inner space of the header tank 34 is partitioned into plural space parts and a case where the inner space of the header tank 34 is not partitioned into plural space parts. In contrast, in the second embodiment, as shown in FIGS. 5A–6, a spherical valve body 38 having a through hole 38a is provided in each header tank 34 to be rotatable in the header tank 34 by an actuator 39 such as a servomotor and a step motor, so as to switch one of the case where the inner space of the header tank 34 is partitioned into the plural space parts (e.g., two space parts) and the case where the inner space of the header tank 34 is not partitioned.

When both the vapor-compression refrigerant cycle and the Rankine cycle are operated at the same time, the valve body 38 is rotated so that an open direction of the through hole 38a is approximately perpendicular to the longitudinal direction of the header tank 34 so that the inner space of the header tank 34 is partitioned into upper and lower space parts. Further, the compressor 1 and the pump 14 are operated so that high-temperature engine-cooling water is circulated into the heating unit 15.

Accordingly, when both the vapor-compression refrigerant cycle and the Rankine cycle are operated, refrigerant (fluid) discharged from the compressor 1 flows into an approximate lower half part of the core portion 33 through the lower space part of the header tank 34, and refrigerant (fluid) discharged from the expansion device 10 flows into an approximate upper half part of the core portion 33 through the upper space part of the header tank 34. In this example, the refrigerant discharged from the compressor 1 flows into the approximate lower half part of the core portion 33 through the lower space part of the header tank 34, and the refrigerant discharged from the expansion device 10 flows through the approximate upper half part of the core portion 33. However, this arrangement of the lower half part and the upper half part in the core portion 33 can be changed. For example, refrigerant discharged from the compressor 1 can flow into the upper half part of the core portion 33 through the upper space part of the header tank 34, and refrigerant discharged from the expansion device 10 can flow into the lower half part of the core portion 33 through the lower space part of the header tank 34.

According to the second embodiment, when both the vapor-compression refrigerant cycle and the Rankine cycle are operated, the inner space in each header tank 34 is partitioned into the upper space part and the lower space part so that the approximate half part of the core portion 33 is used as the radiator 2 and the other approximate half part of the core portion 33 is used as the condenser 12. Thus, in the vapor-compression refrigerant cycle, refrigerant circulates in this order of the compressor 1→the heat exchanger 30 (radiator 2)→the receiver 3→the expansion valve 4→the evaporator 5→the compressor 1. Therefore, refrigerant is evaporated in the evaporator 5 by absorbing heat from air to be blown into the vehicle compartment, while the heat from the gas refrigerant evaporated in the evaporator 5 is radiated in the radiator 2 constructed in the heat exchanger 30.

In contrast, in the Rankine cycle, super-heat refrigerant vapor generated in the heating unit 15 is decompressed and is expanded in the expansion device 10 in iso-entropy, and mechanical energy corresponding the expanding energy is output.

Figure 7A:
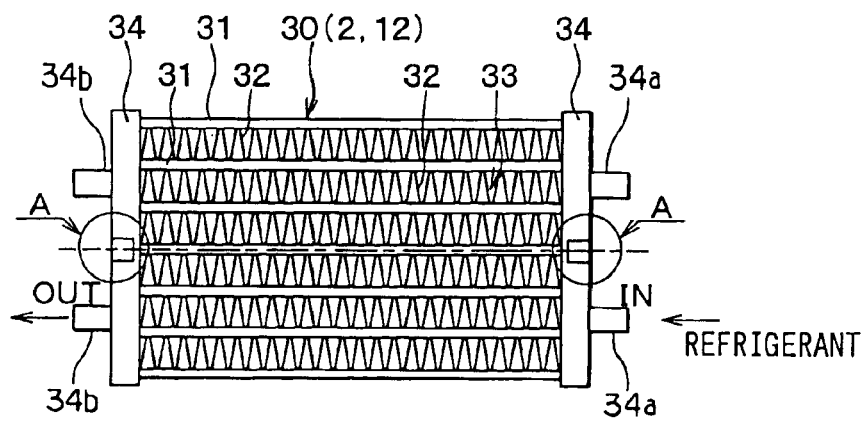
FIG. 7A is a front view showing the heat exchanger of the combined cycle system when only the vapor-compression refrigerant cycle is operated according to the second embodiment.
Figure 7B:
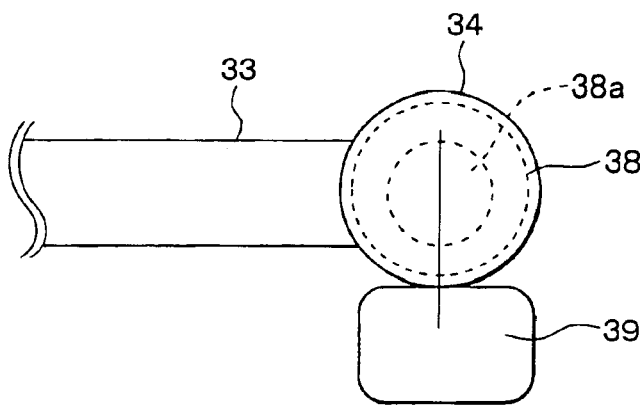
FIG. 7B is a partial top view showing the heat exchanger in FIG. 7A.
Figure 8:
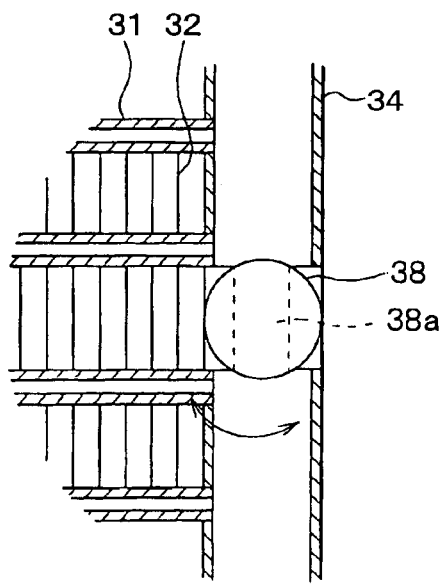
FIG. 8 is an enlarged partial sectional view of a portion A in FIG. 7A.

Next, operation of the combined cycle system will be now described in a case where only the vapor-compression refrigerant cycle is operated. When only the vapor-compression refrigerant cycle is operated, as shown in FIGS. 7A, 7B, 8, the opening direction of the through hole 38a is in the longitudinal direction of the header tank 34 so that the upper and lower space parts in each header tank 34 communicates with each other. Further, the compressor 1 is operated while the electromagnetic clutch 11 is disconnected. Therefore, high-pressure refrigerant discharged from the compressor 1 flows into an approximate all area of the core portion 33 of the heat exchanger 30, and the approximate all area of the core portion 33 of the heat exchanger 30 is used as the radiator 2 in the vapor-compression refrigerant cycle.

Thus, in the vapor-compression refrigerant cycle, refrigerant circulates in this order of the compressor 1→the heat exchanger 30 (radiator 2)→the receiver 3→the expansion valve 4→the evaporator 5→the compressor 1. Therefore, refrigerant is evaporated in the evaporator 5 by absorbing heat from air to be blown into the vehicle compartment, while the heat from the gas refrigerant evaporated in the evaporator 5 is radiated in the radiator 2 constructed in the heat exchanger 30. Therefore, air passing through the evaporator 5 can be sufficiently cooled.

Figure 9A:
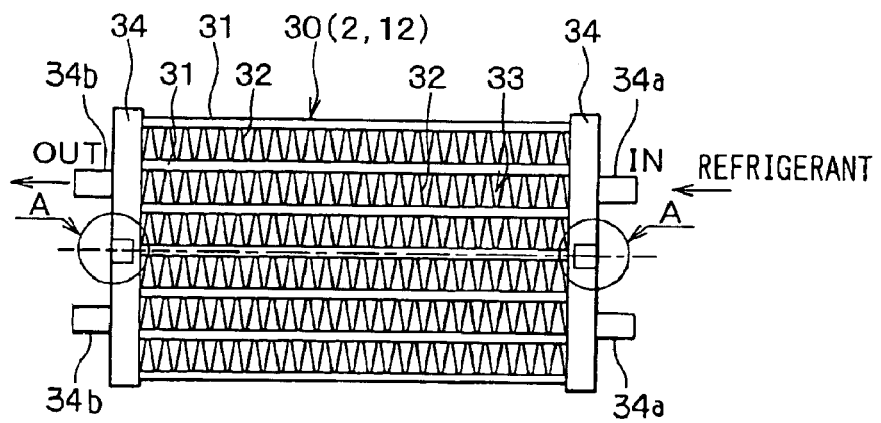
FIG. 9A is a front view showing the heat exchanger of the combined cycle system when only the Rankine cycle is operated according to the second embodiment.
Figure 9B:
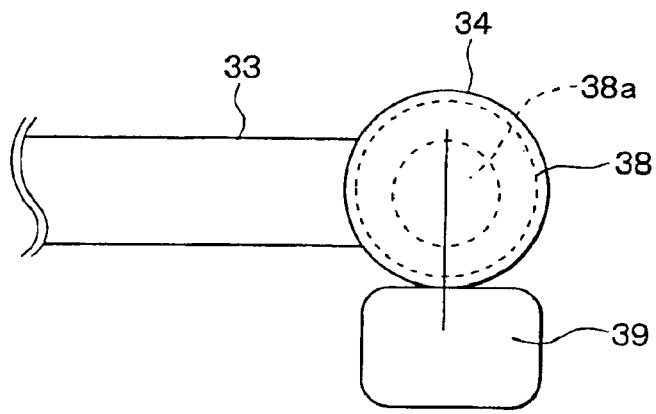
FIG. 9B is a partial top view showing the heat exchanger in FIG. 9A.
Figure 10:
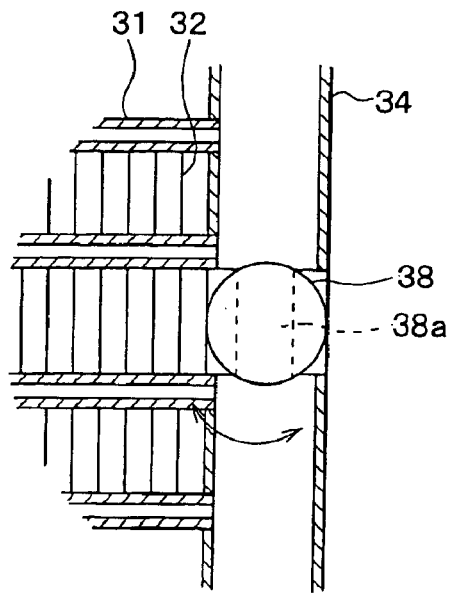
FIG. 10 is an enlarged partial sectional view of a portion A in FIG. 9A.

Next, the operation of the combined cycle system will be now described in a case where only the Rankine cycle is operated. When only the Rankine cycle is operated, as shown in FIGS. 9A, 9B, 10, the open direction of the through hole 38a is positioned in the longitudinal direction of the header tank 34 so that the upper and lower two space parts in each of the header tanks 34 communicate with each other. Further, the pump 14 is operated while the electromagnetic clutch 11 is disconnected. Thus, an approximate all area of the core portion 33 of the heat exchanger 30 is used as the condenser 12, and refrigerant flowing out of the expansion device 10 flows into the approximate all area of the core portion 33 of the heat exchanger 30.

Thus, in the Rankine cycle, super-heat refrigerant vapor generated in the heating unit 15 is decompressed and is expanded in the expansion device 10 in iso-entropy, and mechanical energy corresponding the expanding energy can be recovered. Therefore, the exhaust energy can be effectively recovered through the Rankine cycle.

(Third Embodiment)

Figure 11A:
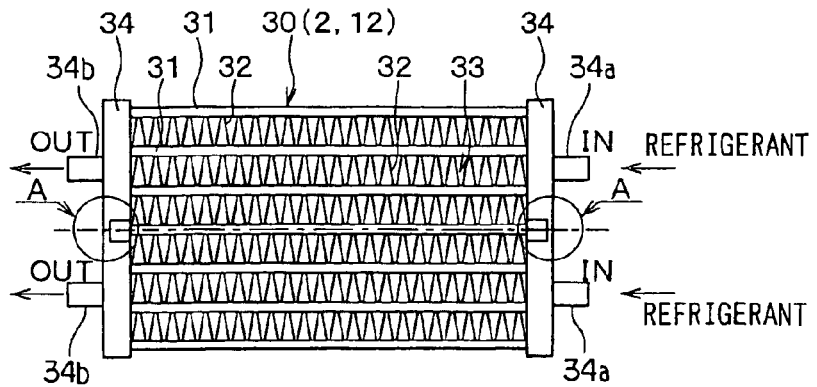
FIG. 11A is a front view showing a heat exchanger used for a combined cycle system when a vapor-compression refrigerant cycle and a Rankine cycle are simultaneously operated according to a third embodiment of the present invention.
Figure 11B:
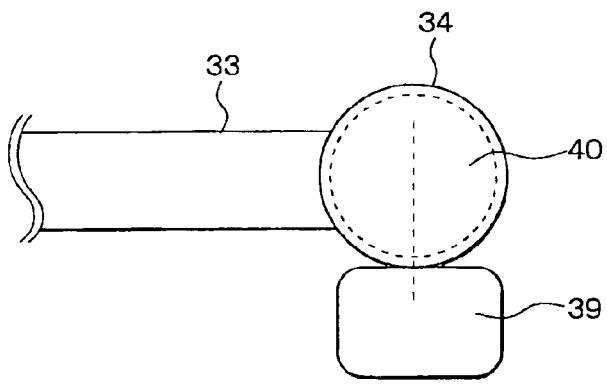
FIG. 11B is a partial top view showing the heat exchanger in FIG. 11A.
Figure 12:
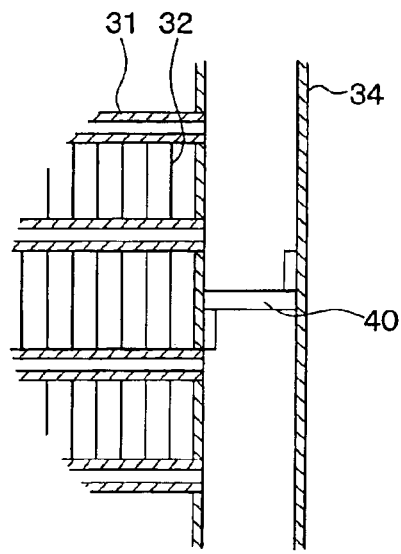
FIG. 12 is an enlarged partial sectional view of a portion A in FIG. 11A.

The third embodiment of the present invention will be now described with reference to FIGS. 11A to 16. In the above-described first embodiment, the plunger 35 is displaced while sliding so as to switch between a case where the inner space of the header tank 34 is partitioned into plural space parts and a case where the inner space of the header tank 34 is not partitioned. In contrast, in the third embodiment, as shown in FIGS. 11A–12, a disk-shaped butterfly valve body 40 is disposed in each header tank 34 to be rotated by an actuator 39 such as a servomotor and a step motor, so as to switch one of the case where the inner space of the header tank 34 is partitioned into the plural space parts (e.g., two space parts) and the case where the inner space of the header tank 34 is not partitioned.

When both the vapor-compression refrigerant cycle and the Rankine cycle are operated at the same time, the valve body 40 is rotated so that a flat surface of the valve body 40 is approximately perpendicular to the longitudinal direction of the header tank 34 so that the inner space of the header tank 34 is partitioned into upper and lower space parts. Further, the compressor 1 and the pump 14 are operated so that high-temperature engine-cooling water is circulated into the heating unit 15.

Accordingly, when both the vapor-compression refrigerant cycle and the Rankine cycle are operated, refrigerant discharged from the compressor 1 flows into an approximate lower half part of the core portion 33 through the lower space part of the header tank 34, and refrigerant discharged from the expansion device 10 flows into an approximate upper half part of the core portion 33 through the upper space part of the header tank 34. In this example, the refrigerant discharged from the compressor 1 flows into the lower half part of the core portion 33 through the lower space part of the header tank 34, and the refrigerant discharged from the expansion device 10 flows into the upper half part of the core portion 33 through the upper space part of the header tank 34. However, this arrangement of the lower half part and the upper half part in the core portion 33 can be changed. For example, refrigerant discharged from the compressor 1 can flow into the upper half part of the core portion 33 through the upper space part of the header tank 34, and refrigerant discharged from the expansion device 10 can flow into the lower half part of the core portion 33.

According to the third embodiment of the present invention, when both the vapor-compression refrigerant cycle and the Rankine cycle are operated, the inner space in each header tank 34 is partitioned into the upper space part and the lower space part so that an approximate half part of the heat exchanger 30 is used as the radiator 2 and the other approximate half part of the heat exchanger 30 is used as the condenser 12. Thus, both the vapor-compression refrigerant cycle and the Rankine cycle can be operated by using the single heat exchanger 30 as the radiator 2 of the vapor-compression refrigerant cycle and the condenser 12 of the Rankine cycle.

Figure 13A:
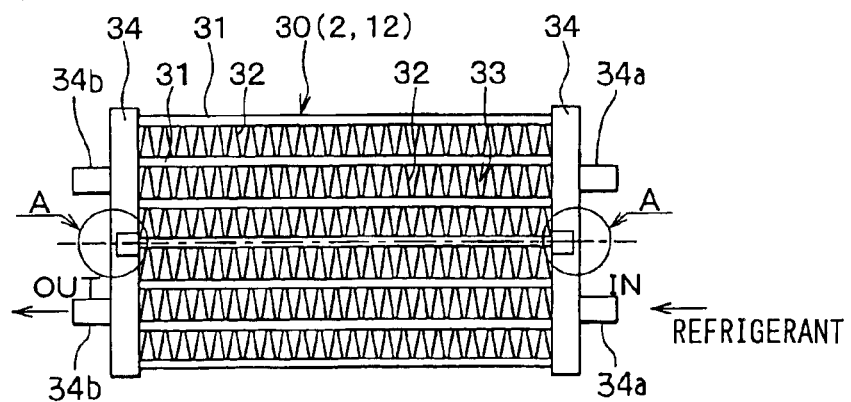
FIG. 13A is a front view showing the heat exchanger of the combined cycle system when only the vapor-compression refrigerant cycle is operated according to the third embodiment.
Figure 13B:
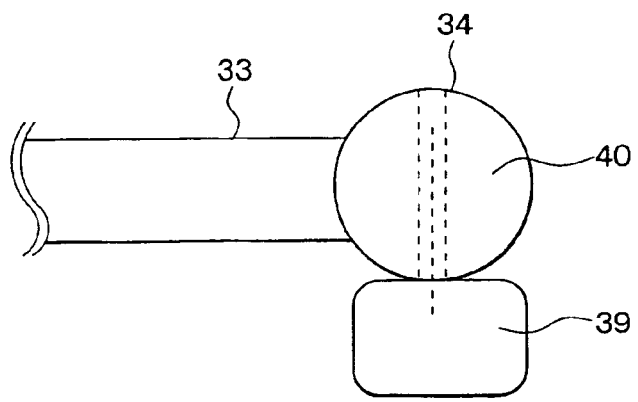
FIG. 13B is a partial top view showing the heat exchanger in FIG. 13A.
Figure 14:
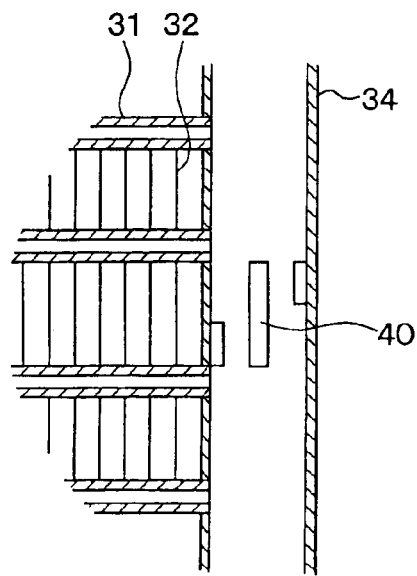
FIG. 14 is an enlarged partial sectional view of a portion A in FIG. 13A.

When only the vapor-compression refrigerant cycle is operated, as shown in FIGS. 13A, 13B, 14, the flat surface of the valve body 40 is parallel to the longitudinal direction of the header tank 34 so that the upper and lower space parts in each header tank 34 communicate with each other. Further, the compressor 1 is operated while the electromagnetic clutch 11 is disconnected. Therefore, high-pressure refrigerant discharged from the compressor 1 flows into all area of the core portion 33 of the heat exchanger 30, and all the area of the core portion 33 of the heat exchanger is used as the radiator 2 in the vapor-compression refrigerant cycle. As a result, the vapor-compression refrigerant cycle can be effectively operated by using all the core portion 33 of the heat exchanger 30 as the radiator 2.

Figure 15A:
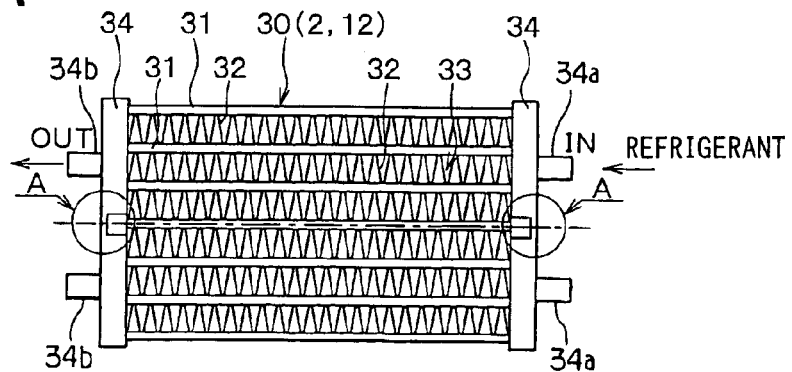
FIG. 15A is a front view showing the heat exchanger of the combined cycle system when only the Rankine cycle is operated according to the third embodiment.
Figure 15B:
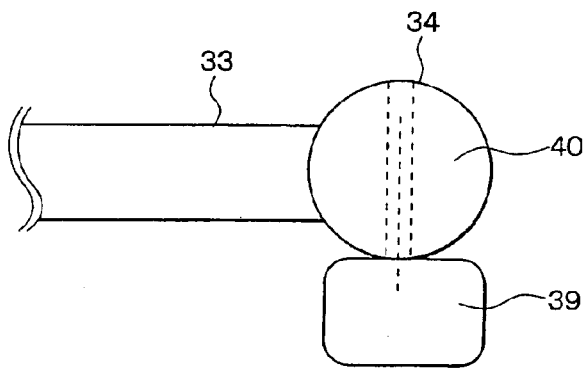
FIG. 15B is a partial top view showing the heat exchanger in FIG. 15A.
Figure 16:
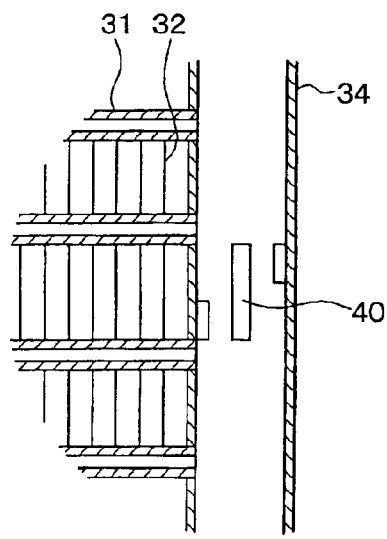
FIG. 16 is an enlarged partial sectional view of a portion A in FIG. 15A.

When only the Rankine cycle is operated, as shown in FIGS. 15A, 15B, 16, the flat surface of the through hole 38a is approximately parallel to the longitudinal direction of the header tank 34 so that the upper and lower two space parts in each of the header tanks 34 communicate with each other. Further, the pump 14 is operated while the electromagnetic clutch 11 is disconnected. Thus, all the area of the core portion 33 of the heat exchanger 30 is used as the condenser 12, and refrigerant (fluid) flowing out of the expansion device 10 flows into all the area of the core portion 33 of the heat exchanger 30. As a result, the Rankine cycle can be effectively operated by using all the core portion 33 of the heat exchanger 30 as the condenser 12.

(Fourth Embodiment)

The fourth embodiment of the present invention will be now described with reference to FIGS. 17A to 20B. In the above-described embodiments, approximately all area of the core portion 33 is used as the radiator 2 or the condenser 12 only when the vapor-compression refrigerant cycle or the Rankine cycle is operated. In contrast, in the fourth embodiment, a ratio between a first function portion used as the radiator 2 in the core portion 33 and a second function portion used as the condenser 12 in the core portion 33 can be continuously changed from 0% to 100%.

Figure 17A:
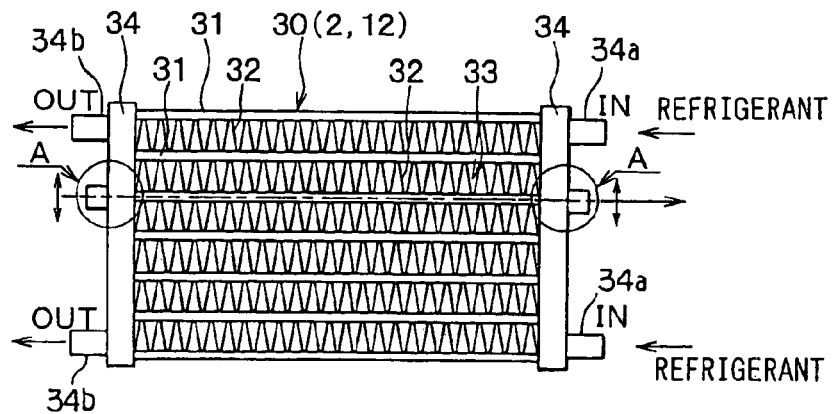
FIG. 17A is a front view showing a heat exchanger used for a combined cycle system when a vapor-compression refrigerant cycle and a Rankine cycle are simultaneously operated according to a fourth embodiment of the present invention.
Figure 17B:
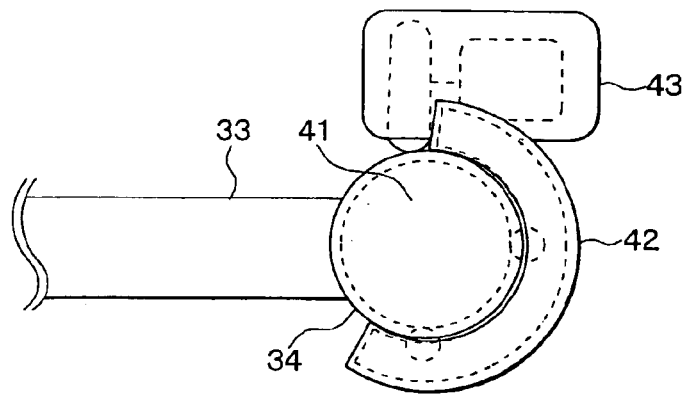
FIG. 17B is a partial top view showing the heat exchanger in FIG. 17A.
Figure 18:
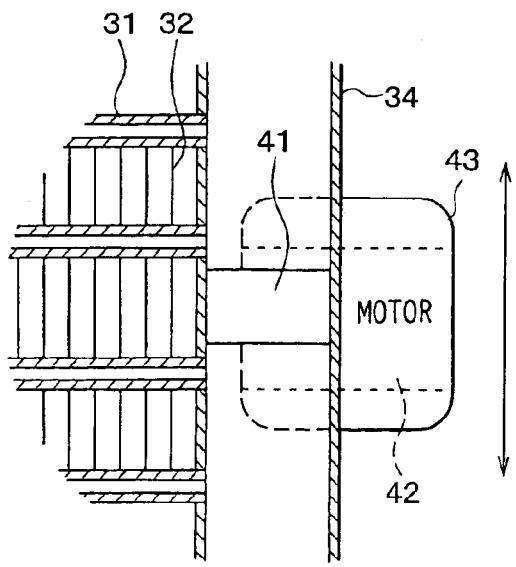
FIG. 18 is an enlarged partial sectional view of a portion A in FIG. 17A.

Specifically, as shown in FIGS. 17A, 17B and 18, a permanent magnet valve body 41 is disposed in each header tank 34 to be movable in the header tank 34 in the axial direction. Further, a circular-arc shaped permanent magnet 42 encloses a part of the valve body 41 from an outside of the header tank 34 to attract the valve body 41. Therefore, when the permanent magnet 42 is displaced in the longitudinal direction of the header tank 34, the valve body 41 moves in the longitudinal direction together with the displacement of the permanent magnet 42. The permanent magnet 42 is displaced in the longitudinal direction of the header tank 34 by an actuator 43 such as a motor. Therefore, the function ratio changing unit is constructed with the valve body 41, the permanent magnet 42 and the actuator 43. Hear, the inner space of the header tank 34 can be partitioned into plural space parts (e.g., two space parts in this embodiment) when the valve body 41 is positioned between two end portions (upper and lower end portions in FIG. 17A) of the header tank 34 in the longitudinal direction of the header tank 34. When the valve body 41 is positioned at the one end portion of the header tank 34 in the longitudinal direction of the header tank 34, the inner space of the header tank 34 is not partitioned, and forms a single communication space.

Further, in this embodiment, both the inlet portions 34a are provided in one header tank 24 at two longitudinal end sides of the header tank 24, and both the outlet portions 34b are provided in the other header tank 24 at two longitudinal end sides of the header tank 24.

In the fourth embodiment, a pinion is provided in the actuator 43 to engage with a rack provided on an outer wall surface of the header tank 34, and is rotated so that the permanent magnet 42 is displaced in the longitudinal direction of the header tank 34. However, the structure of the actuator 43 is not limited to it. For example, the actuator 43 can be constructed by a linear motor.

Next, operation of the combined cycle system according to the fourth embodiment of the present invention will be now described.

When both the vapor-compression refrigerant cycle and the Rankine cycle are operated, as shown in FIGS. 17A and 18, the inner space in each header tank 34 is partitioned at a suitable position (e.g., approximate middle position) into the upper space part and the lower space part so that an upper part of the core portion 33 is used as the radiator 2 and the other part of the core portion 33 is used as the condenser 12. Thus, both the vapor-compression refrigerant cycle and the Rankine cycle can be operated by using the single heat exchanger 30 as the radiator 2 of the vapor-compression refrigerant cycle and the condenser 12 of the Rankine cycle.

Further, the ratio between the first function portion used as the radiator 2 in the core portion 33 and the second function portion used as the condenser 12 in the core portion 33 can be continuously changed in accordance with a heat load of the vapor-compression refrigerant cycle and a power amount to be recovered in the Rankine cycle.

Figure 19A:
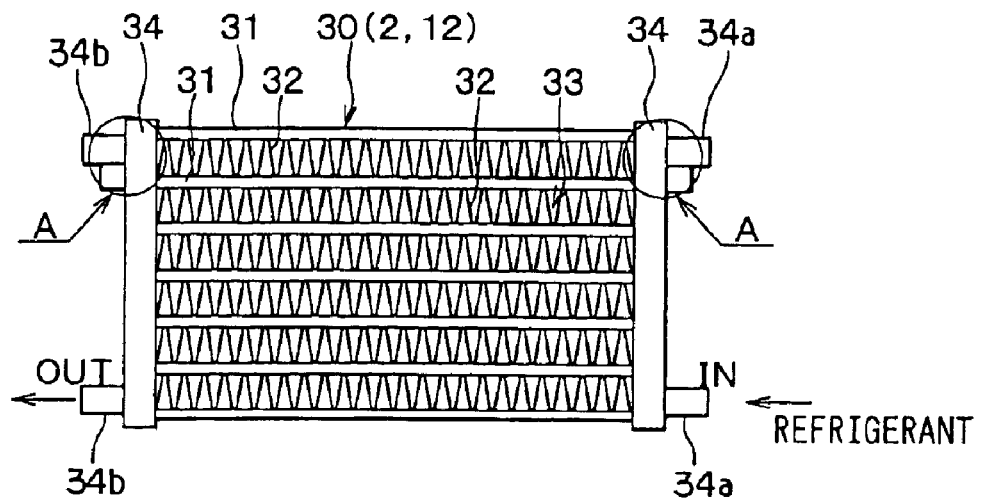
FIG. 19A is a front view showing the heat exchanger of the combined cycle system when only the vapor-compression refrigerant cycle is operated according to the fourth embodiment.
Figure 19B:
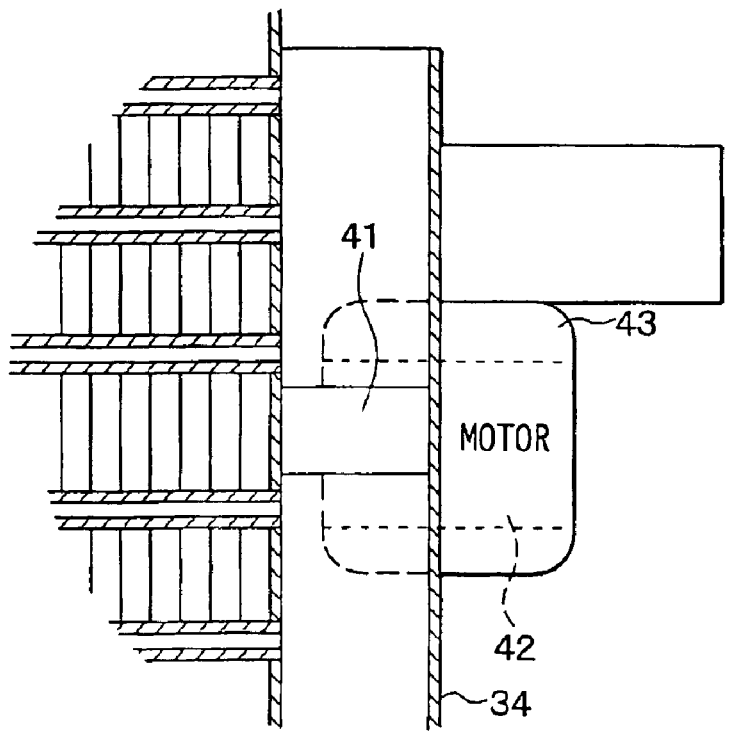
FIG. 19B is an enlarged partial sectional view of a portion A in FIG. 19A.

When only the vapor-compression refrigerant cycle is operated, as shown in FIGS. 19A, 19B, the valve body 41 is moved to one longitudinal end side of the header tank 34 so that approximately all of the core portion 33 is used as the radiator 2. Further, the compressor 1 is operated while the electromagnetic clutch 11 is disconnected. Therefore, high-pressure refrigerant discharged from the compressor 1 flows into approximately all area of the core portion 33 of the heat exchanger 30, and the approximate all area of the core portion 33 of the heat exchanger 30 is used as the radiator 2 in the vapor-compression refrigerant cycle. As a result, the vapor-compression refrigerant cycle can be effectively operated by using all the core portion 33 of the heat exchanger 30 as the radiator 2.

Figure 20A:
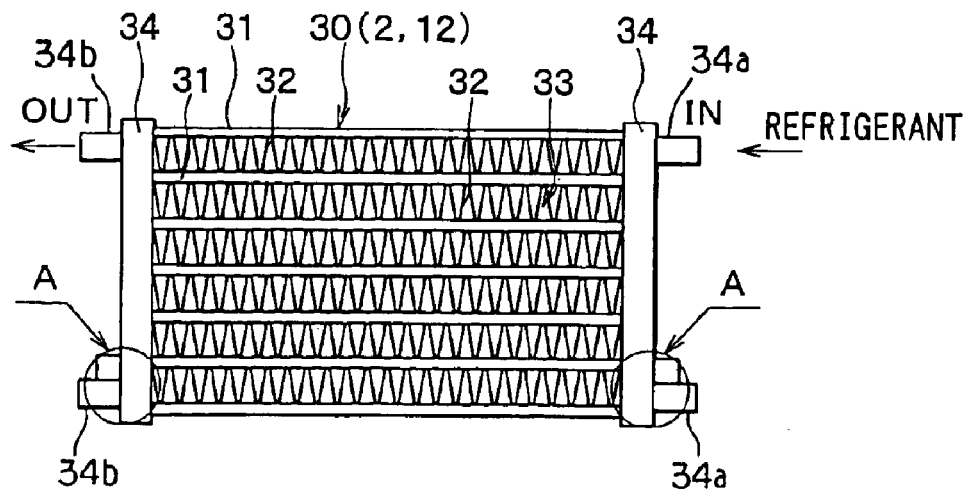
FIG. 20A is a front view showing the heat exchanger of the combined cycle system when only the Rankine cycle is operated according to the fourth embodiment.
Figure 20B:
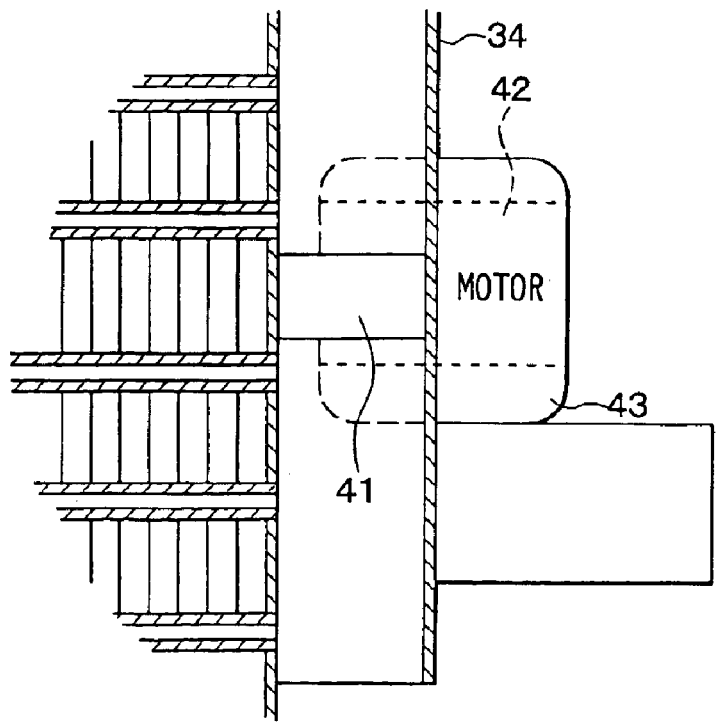
FIG. 20B is an enlarged sectional view of a portion A in FIG. 20A.

When only the Rankine cycle is operated, as shown in FIGS. 20A, 20B, the valve body 41 is moved to the other longitudinal end side of the header tank 34 so that approximate all area of the core portion 33 is used as the condenser 12. Further, the pump 14 is operated while the electromagnetic clutch 11 is disconnected. Thus, the approximate all area of the core portion 33 of the heat exchanger 30 is used as the condenser 12, and refrigerant flowing out of the expansion device 10 flows into the approximate all area of the core portion 33 of the heat exchanger 30. As a result, the Rankine cycle can be effectively operated by using approximately all the heat exchanger 30 as the condenser 12.

Although the present invention has been fully described in connection with the preferred embodiments thereof with reference to the accompanying drawings, it is to be noted that various changes and modifications will become apparent to those skilled in the art.

For example, in the above-described embodiments, the present invention is typically applied to a combined cycle system for a vehicle, however, the prevent invention can be applied to the other use.

Further, in the above-described embodiments, the expansion valve 4 for decompressing refrigerant in iso-enthalpy is used for the vapor-compression refrigerant cycle. However, the other decompression device such as an ejector can be used for decompressing refrigerant in iso-enthalpy in the vapor-compression refrigerant cycle.

In the above-described first through third embodiments, the function ratio changing unit is disposed in each of the header tanks 34. However, the function ratio changing unit can be provided only in one header tank.

Such changes and modifications are to be understood as being within the scope of the present invention as defined by the appended claims.

What is claimed is:

1. A heat exchanger for a combined cycle system that includes: a vapor-compression refrigerant cycle having a compressor for compressing refrigerant, a radiator for cooling high-pressure refrigerant discharged from the compressor and an evaporator for evaporating low-pressure refrigerant after being decompressed; and a Rankine cycle which recovers energy by expanding a super-heat vapor fluid and has a condenser for cooling and condensing the vapor fluid after being expanded, the heat exchanger comprising
    a core portion in which at least one of the refrigerant and the fluid flows to perform heat exchange, the core portion being provided to have at least one of a first function portion used as the radiator and a second function portion used as the condenser; and
    a function ratio changing unit which changes a ratio between the first function portion and the second function portion in the core portion.

2. The heat exchanger according to claim 1, wherein the fluid is the same material as the refrigerant.

3. The heat exchanger according to claim 1, wherein the core portion includes a plurality of tubes through which at least one of the refrigerant and the fluid flows, the heat exchanger further comprising
    first and second header tanks disposed at two end sides of each tube in a tube longitudinal direction, respectively, wherein:
    each of the first and second header tanks extends in a tank longitudinal direction perpendicular to the tube longitudinal direction to communicate with the tubes; and
    the function ratio changing unit is disposed in each of the first and second header tanks to change the ratio between the first function portion and the second function portion in the core portion.

4. The heat exchanger according to claim 3, wherein:
    the function ratio changing unit includes a displacement member that is displaced in a direction perpendicular to the tank longitudinal direction to switch between a first case where an inner space of each header tank is separated into plural space parts and a second case where the inner space of each header tank is a single communication space without a partition due to the displacement member; and
    the function ratio changing unit changes the ratio between the first function portion and the second function portion in the core portion by switching between the first case and the second case.

5. The heat exchanger according to claim 3, wherein:
    the function ratio changing unit includes a valve body having a through hole, disposed in each of the first and second header tanks;
    the valve body is disposed in each of the first and second header tanks to switch between a first case where an inner space of each header tank is separated into plural space parts and a second case where the inner space of each header tank is a single communication space without a partition; and
    the function ratio changing unit changes the ratio between the first function portion and the second function portion in the core portion by switching between the first case and the second case.

6. The heat exchanger according to claim 3, wherein:
    the function ratio changing unit includes a butterfly valve body disposed in each of the first and second header tanks;
    the valve body is disposed in each of the first and second header tanks to switch between a first case where an inner space of each header tank is separated into plural space parts and a second case where the inner space of each header tank is a single communication space without a partition; and
    the function ratio changing unit changes the ratio between the first function portion and the second function portion in the core portion by switching between the first case and the second case.

7. The heat exchanger according to claim 3, wherein:
    the function ratio changing unit includes a displacement member that is displaced in the tank longitudinal direction to switch between a first case where an inner space of each header tank is separated into plural space parts and a second case where the inner space of each header tank is a single communication space without a partition; and
    the function ratio changing unit changes the ratio between the first function portion and the second function portion in the core portion by switching between the first case and the second case.

8. The heat exchanger according to claim 1, wherein the core portion includes a plurality of tubes through which at least one of the refrigerant and the fluid flows, the heat exchanger further comprising
    a header tank disposed at one end side of each tube in a tube longitudinal direction, to extend in a tank longitudinal direction perpendicular to the tube longitudinal direction to communicate with the tubes,
    wherein the function ratio changing unit is disposed in the header tank to change the ratio between the first function portion and the second function portion in the core portion.

9. The heat exchanger according to claim 1, wherein the function ratio changing unit continuously changes the ratio between the first function portion and the second function portion.

10. A combined cycle system comprising:
    a vapor-compression refrigerant cycle including a compressor for compressing a fluid, a radiator for cooling a high-pressure fluid discharged from the compressor, and an evaporator for evaporating a low-pressure fluid after being decompressed; and a Rankine cycle including an expansion device that expands a super-heat fluid for recovering energy, and a condenser for cooling and condensing the fluid flowing from the expansion device, wherein the radiator and the condenser are integrated to form a heat exchanger including a core portion in which the fluid flows to perform heat exchange, the heat exchanger being constructed to have at least one of a first function portion used as the radiator and a second function portion used as the condenser, the combined cycle system further comprising a function ratio changing unit provided in the heat exchanger to change a ratio between the first function portion and the second function portion in the core portion.

11. The combined cycle system according to claim 10, wherein:

the core portion includes a plurality of tubes through which the fluid flows;

the heat exchanger further includes first and second header tanks disposed at two end sides of each tube in a tube longitudinal direction, respectively;

each of the first and second header tanks extends in a tank longitudinal direction perpendicular to the tube longitudinal direction to communicate with the tubes; and the function ratio changing unit is disposed in each of the first and second header tanks to change the ratio between the first function portion and the second function portion in the core portion.

12. The combined cycle system according to claim 11, wherein:

the function ratio changing unit includes a displacement member that is displaced in a direction perpendicular to the tank longitudinal direction to switch between a first case where an inner space of each header tank is separated into plural space parts and a second case where the inner space of each header tank is a single communication space without a partition due to the displacement member; and the function ratio changing unit changes the ratio between the first function portion and the second function portion in the core portion by switching between the first case and the second case.

13. The combined cycle system according to claim 11, wherein:

the function ratio changing unit includes a valve body having a through hole, disposed in each of the first and second header tanks;

the valve body is disposed in each of the first and second header tanks to switch between a first case where an inner space of each header tank is separated into plural space parts and a second case where the inner space of each header tank is a single communication space without a partition; and the function ratio changing unit changes the ratio between the first function portion and the second function portion in the core portion by switching between the first case and the second case.

14. The heat exchanger according to claim 11, wherein:

the function ratio changing unit includes a butterfly valve body disposed in each of the first and second header tanks;

the valve body is disposed in each of the first and second header tanks to switch between a first case where an inner space of each header tank is separated into plural space parts and a second case where the inner space of each header tank is a single communication space without a partition; and the function ratio changing unit changes the ratio between the first function portion and the second function portion in the core portion by switching between the first case and the second case.

15. The combined cycle system according to claim 11, wherein:

the function ratio changing unit includes a displacement member that is displaced in the tank longitudinal direction to switch between a first case where an inner space of each header tank is separated into plural space parts and a second case where the inner space of each header tank is a single communication space without a partition; and the function ratio changing unit changes the ratio between the first function portion and the second function portion in the core portion by switching between the first case and the second case.

16. The combined cycle system according to claim 10, wherein:

when both the vapor-compression refrigerant cycle and the Rankine cycle are operated, the function ratio changing unit is operated to have both the first function portion and the second function portion in the core portion;

when only the vapor-compression refrigerant cycle is operated, the function ratio changing unit is operated to have only the first function portion in the core portion; and when only the Rankine cycle is operated, the function ratio changing unit is operated to have only the second function portion in the core portion.

17. The combined cycle system according to claim 10, wherein the function ratio changing unit continuously changes the ratio between the first function portion and the second function portion in accordance with a heat load of the vapor-compression refrigerant cycle and a power amount to be recovered in the Rankine cycle.

* * * * *